(12) United States Patent
Conner (10) Patent No.: US 9,577,818 B2
(45) Date of Patent: Feb. 21, 2017

(54) HIGH SPEED DATA TRANSFER USING CALIBRATED, SINGLE-CLOCK SOURCE SYNCHRONOUS SERIALIZER-DESERIALIZER PROTOCOL

(71) Applicant: Teradyne, Inc., North Reading, MA (US)

(72) Inventor: George W. Conner, Camarillo, CA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 14/614,326

(22) Filed: Feb. 4, 2015

(65) Prior Publication Data

US 2016/0227004 A1    Aug. 4, 2016

(51) Int. Cl.
    *H04L 7/00*    (2006.01)
(52) U.S. Cl.
    CPC ......... *H04L 7/0029* (2013.01); *H04L 7/0041* (2013.01)
(58) Field of Classification Search
    CPC   G01R 31/28; G01R 31/32; G06F 1/00; G06F 13/42; G06F 19/00; H04B 1/38; H04B 3/00; H04B 15/00; H04B 17/00; H04L 7/0029; H04L 7/0041; H04L 12/66; H04L 69/14; H04L 69/28; H04L 7/00; H04L 29/06
    USPC ................ 324/158, 533, 645; 370/238, 463; 375/219, 220, 226, 257, 376, 221;
    (Continued)

(56) References Cited

U.S. PATENT DOCUMENTS

| | | | | |
|---|---|---|---|---|
| 5,243,273 A | * | 9/1993 | McAuliffe | ....... G01R 31/31905 324/73.1 |
| 5,715,274 A | * | 2/1998 | Rostoker | ................. H01L 23/48 375/130 |

(Continued)

OTHER PUBLICATIONS

Sides et al., SERDES interfaces in an FPGA world: what do I need to know to get started?, Wireless Design & Development. Jun. 6, 2007. Accessed online Jul. 11, 2014. http://www.wirelessdesignmag.com/product-releases/2007/06/serdes-interfaces-fpga-world-what-do-i-need-know-get-started. 4 pages.

(Continued)

*Primary Examiner* — Shawkat M Ali
(74) *Attorney, Agent, or Firm* — Wolf, Greenfield & Sacks, P.C.

(57) ABSTRACT

An electronic system, comprising a first semiconductor device, a second semiconductor device, a clock circuit, and a plurality of independently adjustable calibration circuits connected in each of the plurality of serial data paths. The first semiconductor device may comprise a plurality of Serializer-Deserializer interfaces. The second semiconductor device may comprise a plurality of serial data interfaces coupled to the plurality of Serializer-Deserializer interfaces to provide a plurality of serial data paths between the first semiconductor device and the second semiconductor device. The plurality of Serializer-Deserializer interfaces and the plurality of serial data interfaces may be clocked from a clock signal derived from the clock circuit. The plurality of independently adjustable calibration circuits may be configured to compensate for timing differences across the plurality of serial data paths.

11 Claims, 5 Drawing Sheets

(58) Field of Classification Search
USPC .......... 702/118, 124, 69; 713/500, 501, 503; 714/371, 733, 708, 742
See application file for complete search history.

(56) References Cited

U.S. PATENT DOCUMENTS

| | | | | |
|---|---|---|---|---|
| 5,717,704 | A * | 2/1998 | Rosenfeld | G01R 13/32 714/712 |
| 6,192,069 | B1 * | 2/2001 | Kubinec | H04B 3/548 340/538.15 |
| 6,775,328 | B1 * | 8/2004 | Segaram | H04L 7/0337 375/219 |
| 6,853,181 | B1 * | 2/2005 | Ostertag | G01R 31/31924 324/645 |
| 7,363,563 | B1 * | 4/2008 | Hissen | H04L 1/243 327/144 |
| 7,940,667 | B1 * | 5/2011 | Coady | H04J 3/0691 342/102 |
| 8,352,772 | B2 * | 1/2013 | Kizer | G11C 7/22 710/5 |
| 8,497,704 | B2 * | 7/2013 | Singh | H03K 19/17744 326/38 |
| 2005/0041683 | A1 * | 2/2005 | Kizer | H03M 9/00 370/463 |
| 2006/0123297 | A1 * | 6/2006 | Reichert | G01R 31/31907 714/731 |
| 2006/0184332 | A1 * | 8/2006 | Ishida | G01R 31/31716 702/69 |
| 2007/0061658 | A1 * | 3/2007 | Hsu | G01R 31/31716 714/742 |
| 2008/0013609 | A1 * | 1/2008 | Daxer | H04B 3/46 375/221 |
| 2008/0114563 | A1 * | 5/2008 | Kappauf | G01R 31/319 702/124 |
| 2010/0232489 | A1 * | 9/2010 | Watkins | G01R 31/31709 375/226 |
| 2011/0239031 | A1 * | 9/2011 | Ware | G11C 7/04 713/500 |
| 2012/0216084 | A1 * | 8/2012 | Chun | H04L 25/02 714/708 |
| 2013/0341518 | A1 * | 12/2013 | Fries | A61B 6/037 250/363.03 |
| 2015/0010121 | A1 * | 1/2015 | Su | H04B 17/0062 375/355 |
| 2015/0124634 | A1 * | 5/2015 | Harel | H04B 7/0671 370/252 |
| 2015/0127877 | A1 * | 5/2015 | Novellini | H04L 25/14 710/316 |

OTHER PUBLICATIONS

No Author Listed, Source-synchronous. Wikipedia. Accessed online May 13, 2015. http://en.wikipedia.org/w/index.php?oldid=591990406.

* cited by examiner

HIGH SPEED DATA TRANSFER USING CALIBRATED, SINGLE-CLOCK SOURCE SYNCHRONOUS SERIALIZER-DESERIALIZER PROTOCOL

DISCUSSION OF RELATED ART

Electronic systems may have subsections that process data, with large amounts of data transferred between these subsections. Fast and reliable operation of the system may require transfer of large amounts of data quickly. In designing such a system, the rate of data transfer between two semiconductor devices is limited by various factors. These factors include pin availability to form connections between those devices. Additionally, many factors may impact the speed at which data may be transmitted over each connection. Those factors may include signal to noise ratio, which, in turn may be impacted by power available for transmitting a signal and timing variations introduced by the system.

For example, in an automatic test system, large amounts of data must be transferred between semiconductor devices that determine appropriate control values and pin electronics where those control values are used to generate or measure test signals. The pin electronics are often made of silicon-germanium (SiGe), which may consume a relatively larger amount of power.

One technique used to provide high speed data transfer over a low number of pins is a Serializer-Deserializer interface, which converts data between serial data and parallel data interfaces. A Serializer-Deserializer interface may use various protocols, including 8b/10b coding and embedded clocking.

SUMMARY

Some aspects include an electronic system, comprising a first semiconductor device, a second semiconductor device, a clock circuit, and a plurality of independently adjustable calibration circuits connected in each of the plurality of serial data paths. The first semiconductor device may comprise a plurality of Serializer-Deserializer interfaces. The second semiconductor device may comprise a plurality of serial data interfaces coupled to the plurality of Serializer-Deserializer interfaces to provide a plurality of serial data paths between the first semiconductor device and the second semiconductor device. The plurality of Serializer-Deserializer interfaces and the plurality of serial data interfaces may be clocked from a clock signal derived from the clock circuit. The plurality of independently adjustable calibration circuits may be configured to compensate for timing differences across the plurality of serial data paths.

Further aspects include a method of operating an electronic system comprising a first semiconductor device and a second semiconductor device. The first semiconductor device may comprise a plurality of Serializer-Deserializer interfaces coupled to the second semiconductor device to form a plurality of serial data paths. The method may comprise calibrating the plurality of Serializer-Deserializer interfaces to compensate for in-signal delay among the plurality of serial data paths; transmitting, using a source synchronous Serializer-Deserializer protocol, a plurality of multi-bit words from the first semiconductor device to the second semiconductor device via a first portion of the plurality of Serializer-Deserializer interfaces; transmitting a repeating pattern of bits from the first semiconductor device to the second semiconductor device via a second portion of the plurality of Serializer-Deserializer interfaces; and receiving, at the second semiconductor device, the plurality of multi-bit words using the repeating pattern of bits received via the second portion of the plurality of Serializer-Deserializer interfaces as a reference clock for decoding data received via the first portion of the plurality of Serializer-Deserializer interfaces.

Additional aspects include a method of operating an electronic system. The electronic system may comprise a first semiconductor device and a second semiconductor device. The first semiconductor device may be coupled to the second semiconductor device via a plurality of serial data paths. The method may comprise calibrating the plurality of serial data paths to equalize delay between the first semiconductor device and the second semiconductor device; transmitting, using a Serializer-Deserializer protocol, a plurality of multi-bit words from the first semiconductor device to the second semiconductor device by distributing bits of the plurality of multi-bit words for concurrent transmission via a first portion of the calibrated plurality of serial data paths; and receiving, at the second semiconductor device, the plurality of multi-bit words. The transmitting and receiving may be synchronized with respect to a same clock.

The foregoing is a non-limiting summary of the invention as defined by the appended claims.

BRIEF DESCRIPTION OF THE FIGURES

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The inventors have recognized and appreciated that techniques may be applied with Serializer-Deserializer circuitry to adapt that circuitry to provide high speed data transfer between semiconductor devices using a low number of pins and low power. In accordance with some embodiments, those techniques may include using a source synchronous Serializer-Deserializer (SerDes) protocol. The SerDes circuitry on the semiconductor devices may use clocks derived from the same clock source, which may be distributed, in some embodiments, using one of multiple SerDes paths. In some embodiments, the techniques may include transmitting data over multiple serial data paths and compensating for timing differences over multiple serial data paths. The SerDes path carrying the clock may be calibrated along with the other serial data paths.

When operated according to these techniques, the source synchronous protocol may use significantly less power than SerDes circuitry applying clock recovery techniques often used in SerDes devices. Such a reduction in power usage may be especially relevant when using SiGe semiconductor devices, where conventional techniques may exceed a power allowance. Further, the inventors have recognized and appreciated that techniques as described herein may reduce timing differences between the paths such that the semiconductor devices may be operated, even with sources of jitter and clock domain crossing, which might otherwise cause errors. As a result, the data error rate may be low enough to forego use of a highly redundant error correcting code. For example, 8/10 coding (meaning 8 bits of information are encoded with 10 bits to provide redundant information that may be used in error correction), which is sometimes used to correct errors in SerDes circuit paths, may be avoided. As a result of not using 8b/10b coding greater data throughput may be achieved, such as through the use of 9/10 or 10/10 encoding schemes.

The inventors have recognized and appreciated that data transfer techniques as described herein may be beneficial in a semiconductor device testing environment. A piece of automatic test equipment, referred to as a "tester," may be used to generate test signals that stimulate a device under test (DUT) and to measure the response. In such an environment, a pin electronics semiconductor device may be implemented in SiGe to provide the required speed and accuracy. Circuitry to control the pin electronics and to process data from it may be implemented in a separate CMOS semiconductor device for low cost and low power consumption.

During each cycle of tester operation, data may be transferred from formatting and timing circuitry, which may be in a first semiconductor device, to the pin electronics, which may be in a separate semiconductor device, to specify the desired test or measurement operations to be performed by the pin electronics circuitry. Each pin electronics chip may contain circuitry to generate and measure test signals for multiple channels, each of which may require numerous bits in each tester cycle. Thus, the total number of bits that must be transferred between the semiconductor devices may be very large. For high speed tester operation, that data may be transferred at a very high data rate.

The formatting and timing semiconductor device may be a Field Programmable Gate Array (FPGA). This configuration creates a need to pass data between the two semiconductor devices, one of which may be an FPGA. Known FPGA devices may include multiple I/O pins. Some of those I/O pins may be dedicated to implementing a parallel I/O bus, with multiple parallel paths each transmitting one bit of a data word at a time. Other I/O pins may be connected to SerDes circuitry, and may be used for serial data paths. The serial data paths may transmit bits at a faster rate than any path on a parallel I/O bus, but with multiple paths in parallel, the parallel I/O bus may transmit more bits at a time. For example, each parallel path on a parallel bus may transmit data at a rate up to about 1.2 Gbps. With 8 paths in parallel in a bus, the bus data transfer rate may be 9.6 Gbps. A SerDes path may transmit data at the rate of about 33 Gbps. However, clock recovery circuitry, which is conventionally used to provide accurate data transmission in SerDes paths, may consume more power per channel than is available for a tester, particularly if implemented in a SiGe device.

According to the techniques described herein the SerDes circuitry may be applied to provide high data rates and low pin counts relative to a parallel bus, but acceptable power consumption.

Figure 1:
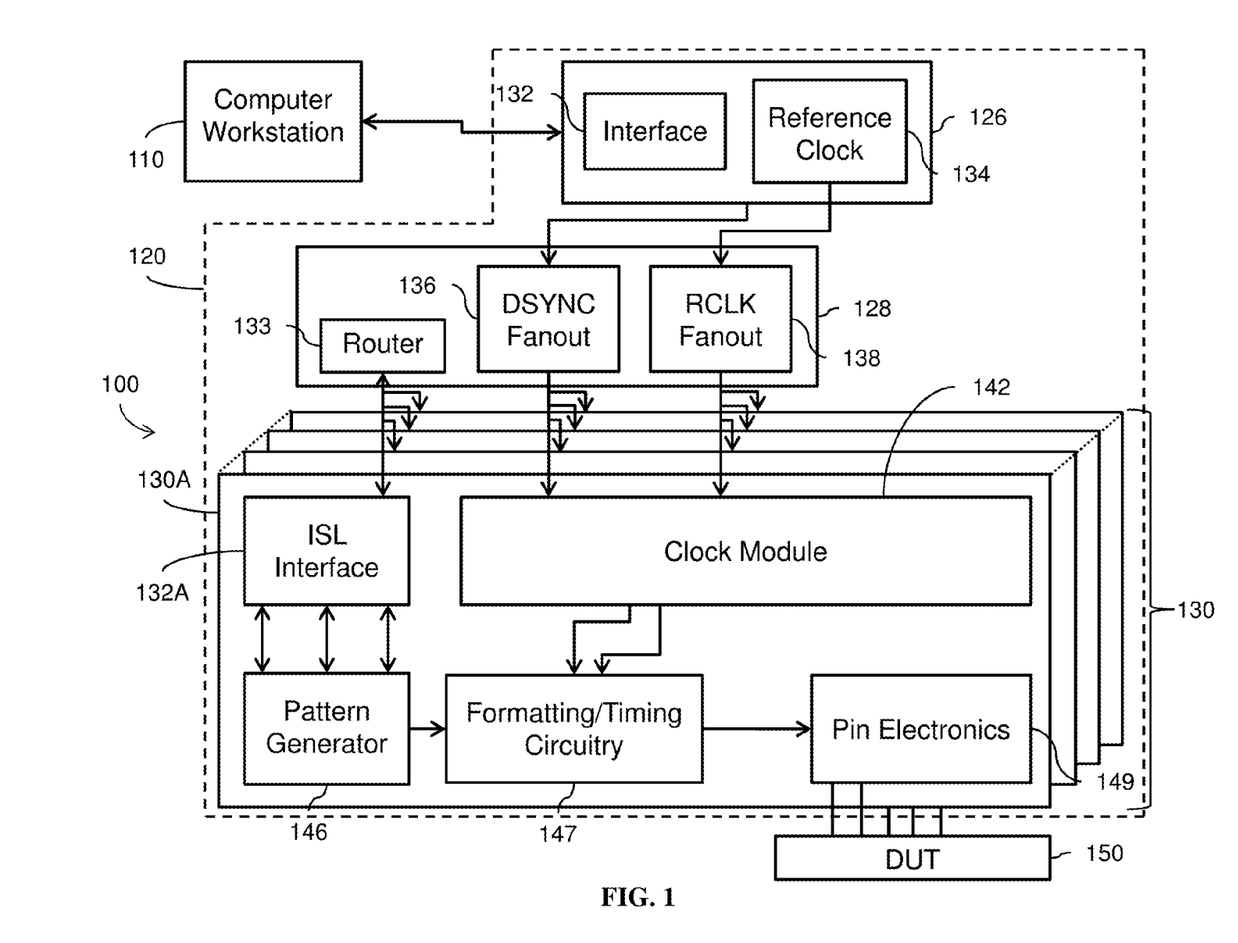
FIG. 1 is a block diagram of an automatic test system in which some embodiments may be applied.

FIG. 1 illustrates an embodiment of an automatic test system or tester, generally designated 100, that may include a computer workstation 110 and a test head 120 (in phantom). The test head may house a plurality of electronic board assemblies for generating and measuring test signals, including central card 126, distribution card 128, and multiple instrument cards 130.

As illustrated in FIG. 1, the central card 126 may feed signals to distribution card 128 for distribution to an array of instrument cards 130. The central card 126 may include a computer interface 132 that ties the workstation 110 to the test head board assemblies, and a reference clock generator 134 that generates a low frequency reference clock, denoted RCLK. The reference clock generator may comprise, for example, a 100 or 400 MHz crystal oscillator. Computer interface 132 may allow the tester to be interfaced to a computer work station 110, through which a user may develop test programs that can be loaded into tester 120. Computer work station 110 may provide a user with other capabilities, such as initiating execution of previously developed test programs or analyzing test results.

In some embodiments, operation of the multiple instrument cards 130 may be synchronized using any suitable techniques. In the embodiment illustrated, the central card 126 may include control circuitry that generates control signals responsive to commands from the workstation. One of the control signals may comprise a "DSYNC" signal. The DSYNC signal may provide a reference time to all instruments or other components intended to have synchronized operation. The reference clock signal and the DSYNC signal may be fanned-out, or distributed, along DSYNC and RCLK fan-out circuitry 136 and 138, respectively, disposed on the distribution of card 128. Distribution of these signals may allow pattern generators on multiple instruments to be started and operate in unison.

The instruments on instrument cards 130 may be digital or analog instruments or may perform functions involving digital and analog signals. Instrument 130A depicts a digital instrument, also called a "channel card." A channel card may contain electronic resources for multiple tester channels. A test system is likely to include multiple channel cards.

As shown in FIG. 1, each instrument card includes circuitry to perform the desired function of the instrument. In the case of a digital instrument such as 130A, the functional circuitry may include formatting/timing circuitry 147 and pin electronics circuitry 149. This circuitry can generate and measure digital signals for testing DUT 150.

In addition, digital instrument 130A may include a pattern generator 146. Pattern generator 146 may provide a sequence of commands that control the functional portions of instrument 130A. Pattern generator 146 may provide branching in response to certain conditions or execute other conditional functions based on a status of the test system. Pattern generator 146 may be clocked by a clock from local clock module 142 and may therefore provide instructions at a programmable rate, which may be higher than the frequency of the reference clock.

In addition, instrument 130A may include an instrument synchronization link (ISL) interface 132A. ISL interface 132A may allow pattern generator 146 to communicate with other instruments, which may similarly contain an ISL interface. Pattern generator 146 may send commands to be executed by the functional circuitry of other instruments or receive status information from other instruments that may, for example, be used to control conditional branching.

Other instruments may have different functional circuitry, depending on the specific function to be implemented by the instrument. In the described embodiment, each instrument card may include a clock module 142. However, as noted above, each instrument may have none, one, or more clock modules.

As shown in FIG. 1, each channel card 130A may include a clock module 142. Clock module 142 may be programmed to generate one or more clocks of a desired frequency from RCLK. In the described embodiment, each of the clocks generated by a clock module 142 is intended to be used "locally," i.e., within the instrument or board containing the clock generator. A clock generator may generate clocks of several different frequencies. Because all of the clocks are generated from the same source, the clocks may be considered synchronous with each other. However, it should be appreciated that the number of clocks generated in a clock module, and whether those clocks are used locally or distributed to other instruments, is not critical.

The clock module may contain circuitry that generates a reference clock at a low, but programmable frequency. That low frequency reference clock may be supplied to a phase locked loop (PLL) or other circuit to generate the reference clock. A PLL may be configured to multiply the frequency of the low frequency reference clock. Alternatively or additionally, the PLL may include a filter that controls jitter.

In the embodiment illustrated, a large amount of data may be transferred between formatting/timing circuitry 147 and pin electronics 149. Techniques for high data rate transfer as described herein may be used to transfer that data. In the embodiment illustrated, formatting/timing circuitry 147 may be implemented in an FPGA. An FPGA may contain multiple SerDes circuits. Pin electronics 149 may also have multiple SerDes circuits. These circuits may be connected to provide multiple paths for transferring data, thus effectively increasing the data transfer rate.

Figure 2:
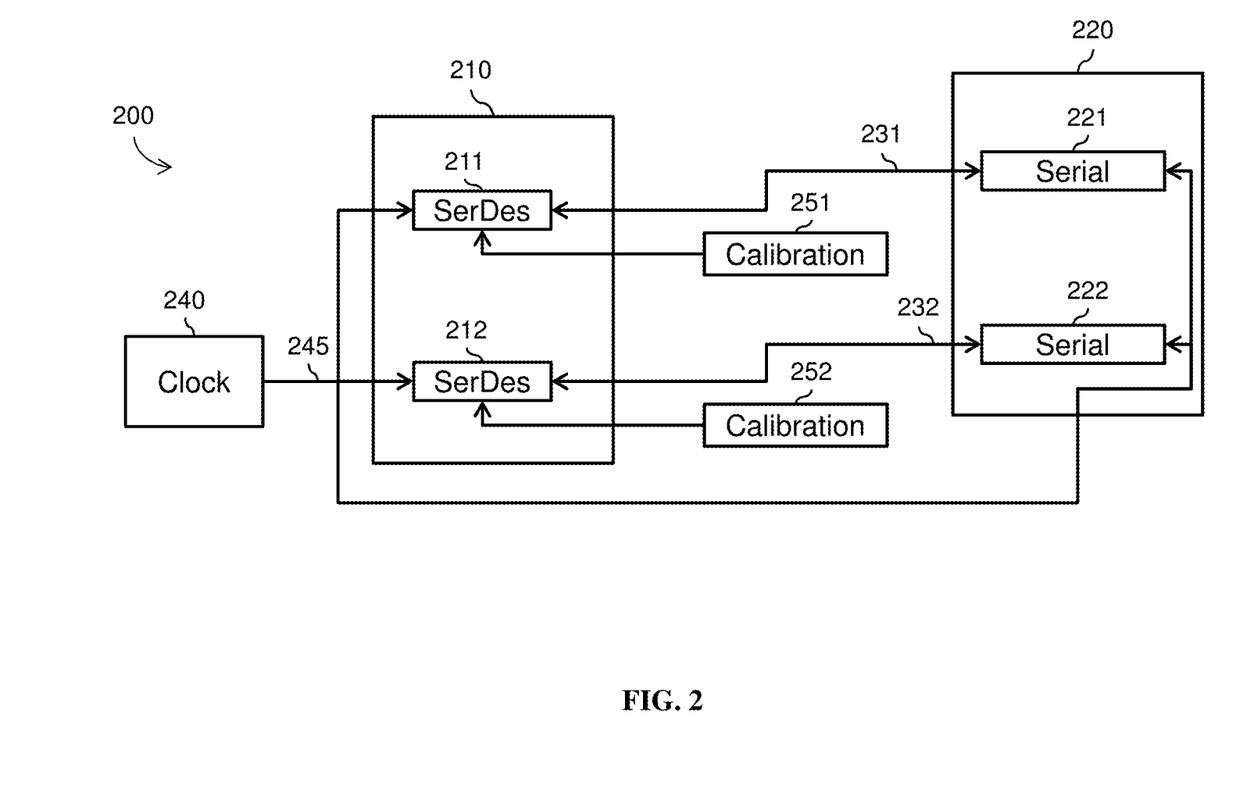
FIG. 2 is a block diagram of a system implementing a single-clock source synchronous Serializer-Deserializer protocol in accordance with some embodiments.

FIG. 2 illustrates a system 200 implementing a single-clock, source synchronous SerDes protocol according to some embodiments. As used herein, "single-clock" indicates that transmission and reception of bits on a path is timed with respect to clocks that are synchronized. There may, however, be other clocks that perform other functions. According to some embodiments, the system 200 may be an automated test system, such as that described above. In such an embodiment, first semiconductor device 210 may be an FPA implementing formatting/timing circuitry and second semiconductor device 220 may be a pin electronics chip.

The system 200 may include a first semiconductor device 210, a second semiconductor device 220, and a clock circuit 240. According to some embodiments, the second semiconductor device 220 may be a SiGe device. Alternatively or additionally, the second semiconductor device 220 may be a pin electronics chip or any other suitable chip device, which may be made of any other suitable material.

The first semiconductor device 210 may include SerDes interfaces 211 and 212. The second semiconductor device 220 may include serial data interfaces 221 and 222, which may be coupled to the SerDes interfaces 211 and 212, respectively, to provide serial data paths 231 and 232 between the first semiconductor device 210 and the second semiconductor device 220.

The system 200 may also include independently adjustable calibration circuits 251 and 252, which may be connected to influence the timing of data in each of the serial data paths 231 and 232. According to some embodiments, the calibration circuits 251 and 252 may be coupled to the SerDes interface 211 and 212, respectively. The calibration circuits 251 and 252 may, for example, vary the time at which data bits are transmitted or detected. As a specific example calibration circuits 251 and 252 may be coupled to a transmit/receive clock for each SerDes circuit and may be adjustable to change a delay in passing a clock signal to the SerDes circuit. In some embodiments, the calibration circuits 251 and 252 may be implemented as phase interpolators and/or any other suitable circuit.

The SerDes interfaces 211 and 212 and the serial data interfaces 221 and 222 may be clocked from a clock signal 245 derived from the clock circuit 240. The calibration circuits 251 and 252 may compensate for timing differences across the serial data paths 231 and 232.

Figure 3:
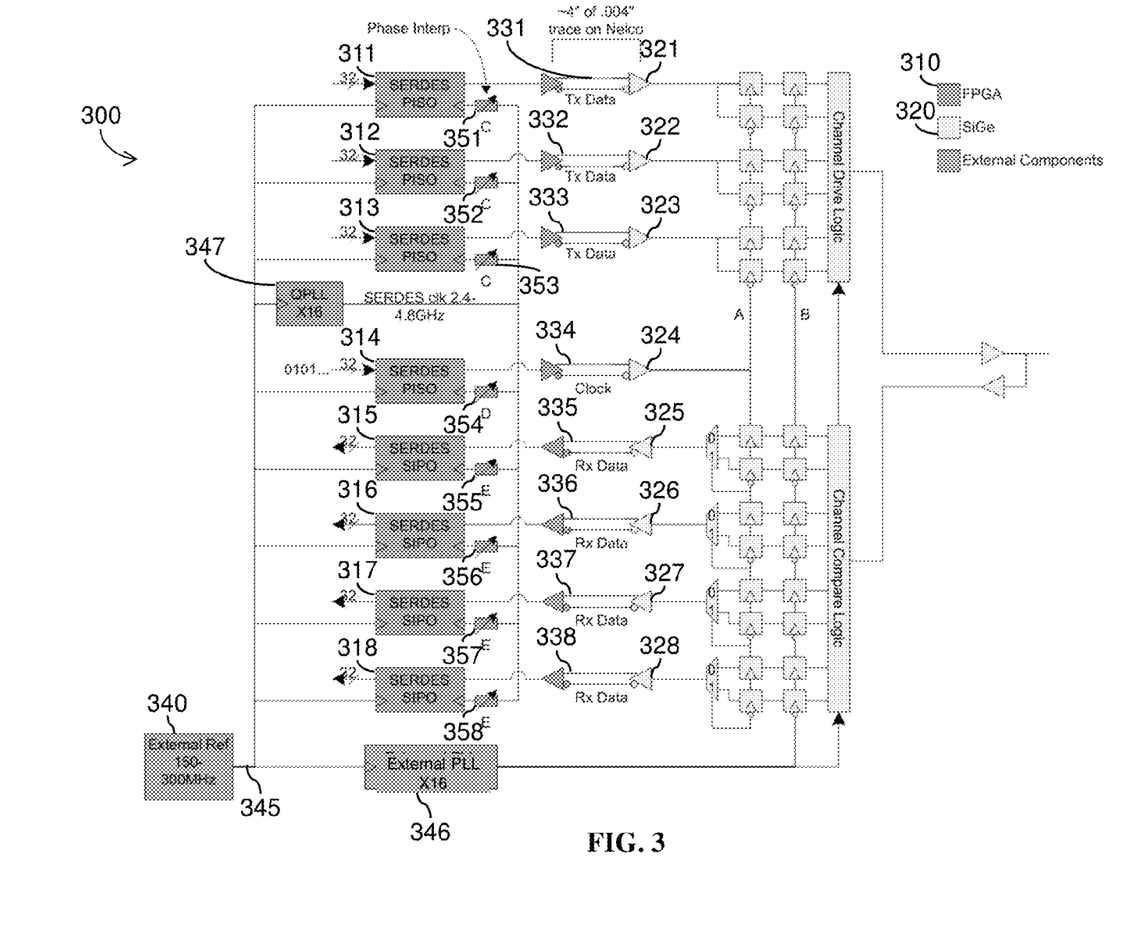
FIG. 3 is a schematic diagram of a system implementing a single-clock source synchronous Serializer-Deserializer protocol in accordance with some embodiments.

FIG. 3 illustrates a system 300 implementing a single-clock, source synchronous SerDes protocol according to some embodiments. FIG. 3 may apply the techniques illustrated in FIG. 2, but additionally illustrates multiple parallel paths as may exist in a tester and illustrates transfer of a clock via a serial path.

The system 300 may include a first semiconductor device 310 (which may correspond to first semiconductor device 210), a second semiconductor device 320 (which may correspond to first semiconductor device 220), and a clock circuit 340 (which may correspond to clock circuit 240). As shown, the first semiconductor device 310 may be a FPGA, and/or the second semiconductor device 320 may be a SiGe device. The clock circuit 340 may be an external reference clock circuit. Here, "external" may mean that the clock is external to the semiconductor devices. That circuitry may be internal to a tester, however, such as within a clock module 142 (FIG. 1).

The first semiconductor device 310 may include SerDes interfaces 311-318. SerDes interfaces 311-314 may be parallel-in, serial-out (PISO) interfaces. SerDes interfaces 315-318 may be serial-in, parallel-out (SIPO) interfaces. The second semiconductor device 320 may include serial data interfaces 321-328, which may be coupled to the SerDes interfaces 311-318, respectively, to provide serial data paths 331-338 between the first semiconductor device 310 and the second semiconductor device 320.

According to some embodiments, a first portion of the serial data paths (i.e., serial data paths 331-333) may be used to transmit data from the first semiconductor device 310 to the second semiconductor device 320. Additionally, a second portion of the serial data paths (i.e., 334) may be used to transmit a reference clock (e.g., the clock signal 345) derived from the clock circuit 340 from the first semiconductor device 310 to the second semiconductor device 320.

Alternatively or additionally, a third portion of the serial data paths (i.e., serial data paths 335-338) may be used to transmit data from the second semiconductor device 320 to the first semiconductor device 310. The serial data interfaces 321-328 may be coupled to the third portion of the serial data paths (i.e., 335-338). As shown in FIG. 3, each path has a dedicated function. However, it is not a requirement that each path be dedicated to a single function. Rather, in some embodiments for example, paths may be operated to perform transmit or receive functions at different times.

According to some embodiments, the clock circuit 340 may output a clock with a frequency in excess of 2 gigaHertz (GHz). Alternatively or additionally, the clock circuit 340 may output a clock with any other suitable frequency.

According to some embodiments, the first semiconductor device 310 may also include a quad PLL (QPLL), which may multiply a clock signal 345 from the clock circuit 340 by a multiplier, such as 16. In this way, a clock on the order of 2 GHz may generate a clock in excess of 30 GHz for timing high speed data transfer on a SerDes path. Alternatively or additionally, the clock circuit 340 may itself include a QPLL 347. The QPLL 347, as shown, may multiply the clock signal 345 from the clock circuit 340 by any other suitable multiplier, including 4 and 8. For example, the clock signal 345 from the clock circuit 340 may be 150-300 megahertz, and the clock signal from the QPLL 347 may be 2.4-3.8 gigahertz based on a multiplier of 16. The clock signal from the QPLL 347 may be used by the SerDes interfaces 311-318.

According to some embodiments, the system 300 may also include a PLL 346 coupled between the clock circuit 340 and the second semiconductor device 320. The PLL 346 may also multiply the clock signal 345 from the clock circuit 340 by a multiplier of 16 or any other suitable multiplier. This multiplier may be equal to the multiplier used by the QPLL 347. However, even when the multiplier is not identical, the clock provided to the first semiconductor device may be synchronized with the clock provided to the second semiconductor device as both are derived from clock signal 345. The clock signal from PLL 358 may be used by the second semiconductor device 320, including as a clock for the serial data interfaces 321-328.

As the clock signal from QPLL 347, the second portion of the serial data paths (i.e., 334), and the clock signal from the PLL 346 may all be based on the clock signal 345 from the clock circuit 340, the SerDes interfaces 311-318 and the serial data interfaces 321-328 may be clocked from a single clock (e.g., the clock signal 345 from the clock circuit 340).

The first semiconductor device 310 may additionally include independently adjustable calibration circuits 351-358. As shown, the calibration circuits 351-358 may be phase interpolators that are configured based on a control input, to adjust the relative time of transmission or reception of bits at each SerDes circuit. The relative delay at each may be established by a program running on computer workstation 110 running a calibration program on the tester or in any other suitable way. The calibration circuits 351-358 may also be coupled, as shown, to the SerDes interfaces 311-318, respectively, and may compensate for timing differences across the SerDes interfaces 311-318 and/or the serial data paths 331-338. According to some embodiments, the calibration circuits 351-358 may center all clocks and data transitions any time a frequency changes.

According to some embodiments, the data dependent jitter of the serial data paths 331-338 may be less than or equal to about 10 to 15 percent of a data eye of the serial data paths 331-338. Alternatively or additionally, the first semiconductor device 310 may be separated from the second semiconductor device 320 by a distance of less than about 6 inches. For example, this distance may be about 4 inches, as shown. Such a distance may be determined based on the desired data dependent jitter of the serial data paths 331-338 described above, or the distance may result in this data dependent jitter.

According to some embodiments, the second semiconductor device 320 may be a pin electronics chip that contains one or more drivers and drive circuitry that may control the drivers in each cycle based on data received concurrently over the first portion of the serial data paths (i.e., 331-333). Additionally, the second semiconductor device 320 may include one or more comparators and compare circuitry that may obtain compare data from the comparators in each cycle and may control transmission of the compare data concurrently over the third portion of the serial data paths (i.e., 335-338). The second semiconductor device 320 may also include multiplexers in the same quantity as the third portion of the serial data paths (i.e., 335-338).

Figure 4:
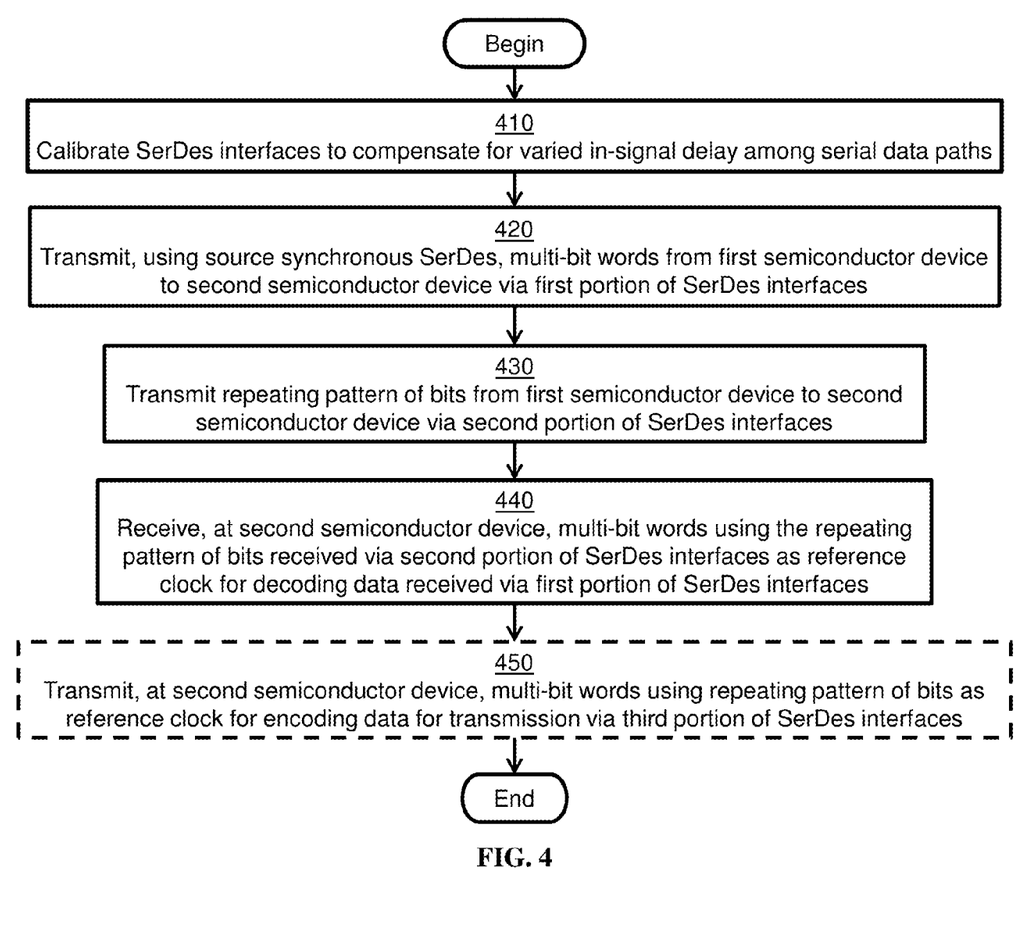
FIG. 4 is a flowchart of a method of operating an electronic system implementing a single-clock, source synchronous Serializer-Deserializer protocol in accordance with some embodiments.

FIG. 4 is a flowchart of a method of operating an electronic system implementing a single-clock source synchronous SerDes protocol in accordance with some embodiments. According to some embodiments, the electronic system may be an automatic test system including multiple channels, and a program running on a workstation coupled to the test system may control test system hardware to perform some or all of the acts illustrated in FIGS. 4-5.

According to some embodiments, at stage 410, the SerDes interfaces (e.g., 311-318) may be calibrated to compensate for varied in-signal delay among the serial data paths (e.g., 331-338). For example, at stage 410, the relative delay in propagation through the paths may be determined. The relative delays may then be used to determine values to program into each of the calibration circuits 351-358 (FIG. 3) to compensate for relative differences.

At stage 420, multi-bit words may be transmitted, using a source synchronous SerDes protocol, from the first semiconductor device (e.g., 310) to the second semiconductor device (e.g., 320) via a first portion of the SerDes interfaces (e.g., 311-313). According to some embodiments, transmitting the multi-bit words may comprise transmitting words with at least 8 bits per channel at a data rate in excess of 25 gigabits per second with a power less than 500 milliwatts per channel. However, any suitable number of bits per channel, data rate, and/or power may be used.

Alternatively or additionally, transmitting the multi-bit words may comprise transmitting data encoded with an encoding scheme with a higher information density than an 8/10 encoding scheme. Alternatively or additionally to these embodiments, transmitting the multi-bit words may comprise transmitting the encoded data at greater than 30 gigabits per second in parallel via the first portion of the SerDes interfaces. However, any suitable information density and/or data rate may be used.

At stage 430, a repeating pattern of bits (e.g., a clock signal derived from the clock circuit 340) may be transmitted from the first semiconductor device to the second semiconductor device via a second portion of the SerDes interfaces (e.g., 314). It should be appreciated that, though FIG. 4 is shown with stage 430 following stage 420 and stage 440 following stage 420, some or all of these stages may occur simultaneously such that the repeating pattern of bits may be used as a clock for both transmission and reception.

At stage 440, the multi-bit words may be received at the second semiconductor device, using the repeating pattern of bits received via the second portion of the SerDes interfaces as a reference clock, which may be used for decoding the data received via the first portion of the SerDes interfaces.

According to some embodiments, at stage 450, multi-bit words may be transmitted at the second semiconductor device using the repeating pattern of bits (received via the second portion of the SerDes interfaces) as a reference clock, which may be used for encoding data for transmission via a third portion of the SerDes interfaces (e.g., 335-338).

Figure 5:
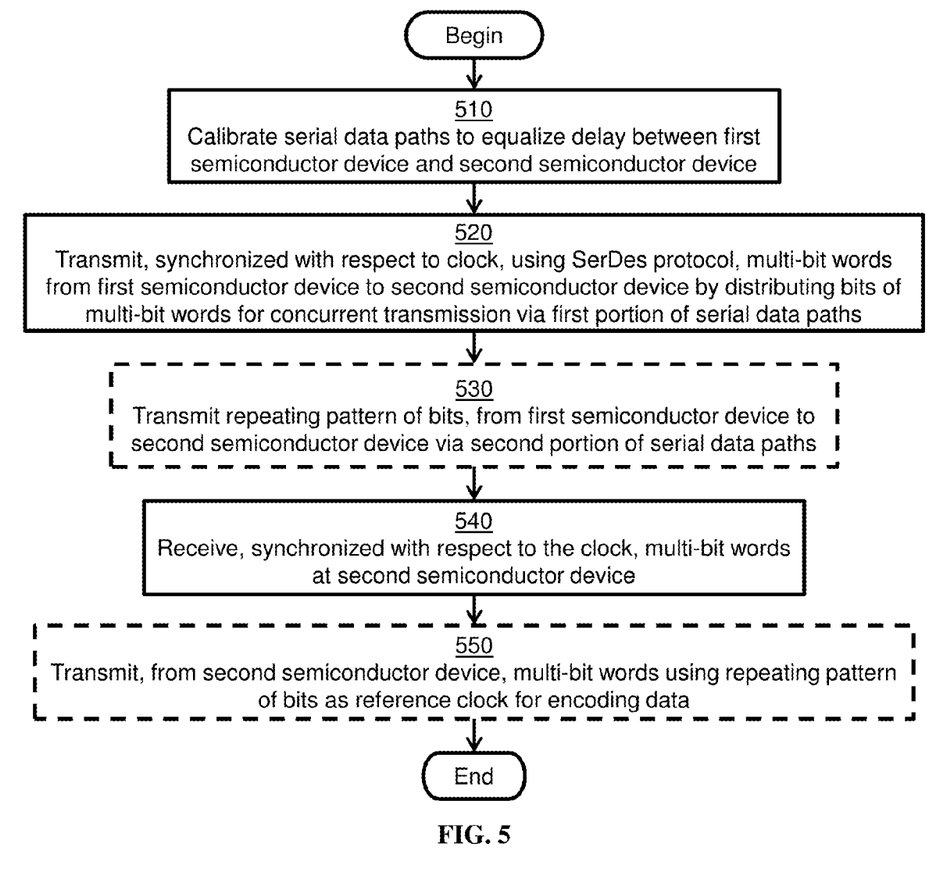
FIG. 5 is a flowchart of an additional method of operating an electronic system implementing a single-clock source synchronous Serializer-Deserializer protocol in accordance with some embodiments.

FIG. 5 is a flowchart of an additional method of operating an electronic system implementing a single-clock, source synchronous SerDes protocol in accordance with some embodiments.

According to some embodiments, at stage 510, the serial data paths (e.g., 331-338) may be calibrated to equalize delay between the first semiconductor device (e.g., 310) and the second semiconductor device (e.g., 320). For example, calibrating the serial data paths may comprise adjusting a control input to one or more phase interpolators (e.g., 351-358). Alternatively or additionally, the calibrated serial data paths may function as a parallel data bus such that bits of the multi-bit words may be transmitted concurrently.

At stage 520, multi-bit words may be transmitted using a SerDes protocol from the first semiconductor device to the second semiconductor device by distributing bits of the multi-bit words for concurrent transmission via a first portion of the calibrated serial data paths (e.g., 331-333). According to some embodiments, the bits of the multi-bit words may be transmitted on each of the calibrated serial data paths using a source synchronous protocol. Alternatively or additionally, the bits of the multi-bit words may be transmitted on each of the calibrated serial data paths using an asymmetric coding scheme.

According to some embodiments, at stage 530, a repeating pattern of bits may be transmitted from the first semiconductor device to the second semiconductor device via a second portion of the calibrated serial data paths (e.g., 334). The repeating pattern of bits may be synchronized with respect to a clock, with respect to which the transmitting of the multi-bit words may be synchronized. Additionally, the repeating pattern of bits may be used as the clock with respect to which the receiving of the multi-bit words may be synchronized.

At stage 540, the multi-bit words may be received at the second semiconductor device. Additionally, the transmitting and receiving of the multi-bit words may be synchronized with respect to the same, single clock.

According to some embodiments, at stage 550, multi-bit words may be transmitted from the second semiconductor device using the repeating pattern of bits received via the second portion of the calibrated serial data paths as a reference clock for encoding data.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electronic system, comprising:
   a first semiconductor device comprising:
      a plurality of Serializer-Deserializer interfaces;
   a second semiconductor device comprising:
      a plurality of serial data interfaces, coupled to the plurality of Serializer-Deserialize interfaces, to provide a plurality of serial data paths between the first semiconductor device and the second semiconductor device;
   a clock circuit; and
   a plurality of independently adjustable calibration circuits connected in each of the plurality of serial data paths, wherein:
      the plurality of Serializer-Deserializer interfaces and the plurality of serial data interfaces are docked from a dock signal derived from the clock circuit,
      the plurality of independently adjustable calibration circuits are configured to compensate for timing differences across the plurality of serial data paths,
      the dock circuit is configured to output a dock with a frequency of 2 gigahertz, and
      the first semiconductor device is separated from the second semiconductor device by a distance of less than 6 inches.

2. The electronic system of claim 1, wherein:
   the first semiconductor device comprises a field-programmable gate array.

3. The electronic system of claim 1, wherein:
   the clock circuit comprises a quad phase locked loop.

4. The electronic system of claim 1, wherein:
   the plurality of calibration circuits comprise a plurality of phase interpolators.

5. The electronic system of claim 1, wherein:
   the second semiconductor device comprises a silicon-germanium device.

6. The electronic system of claim 1, wherein:
   the electronic system comprises an automated test system.

7. The electronic system of claim 6, wherein:
   the second semiconductor device comprises a pin electronics chip.

8. An electronic system, comprising:
   a first semiconductor device comprising:
      a plurality of Serializer-Deserializer interfaces;
   a second semiconductor device comprising:
      a plurality of serial data interfaces, coupled to the plurality of Serializer-Deserialize interfaces, to provide a plurality of serial data paths between the first semiconductor device and the second semiconductor device;
   a clock circuit; and
   a plurality of independently adjustable calibration circuits connected in each of the plurality of serial data paths, wherein:
the plurality of Serializer-Deserializer interfaces and the plurality of serial data interfaces are docked from a dock signal derived from the clock circuit,
the plurality of independently adjustable calibration circuits are configured to compensate for timing differences across the plurality of serial data paths,
a first portion of the plurality of serial data paths are configured for transmission of data from the first semiconductor device to the second semiconductor device, and
a second portion of the plurality of serial data paths are configured for transmission of a reference clock from the clock circuit.

9. The electronic system of claim 8, wherein:
a third portion of the plurality of serial data paths are configured for transmission of data from the second semiconductor device to the first semiconductor device, and
the plurality of serial data interfaces are coupled to the third portion of the plurality of serial data paths.

10. The electronic system of claim 9, wherein:
the second semiconductor device further comprises:
at least one driver and drive circuitry configured to control the at least one driver, in each of a plurality of cycles, based on data received concurrently over the first portion of the plurality of serial data paths; and
at least one comparator and compare circuitry configured to obtain compare data from the at least one comparator, in each of a plurality of cycles, and control transmission of the compare data concurrently over the third portion of the plurality of serial data paths.

11. An electronic system, comprising:
a first semiconductor device comprising:
a plurality of Serializer-Deserializer interfaces;
a second semiconductor device comprising:
a plurality of serial data interfaces, coupled to the plurality of Serializer-Deserialize interfaces, to provide a plurality of serial data paths between the first semiconductor device and the second semiconductor device;
a clock circuit; and
a plurality of independently adjustable calibration circuits connected in each of the plurality of serial data paths,
wherein:
the plurality of Serializer-Deserializer interfaces and the plurality of serial data interfaces are docked from a dock signal derived from the clock circuit,
the plurality of independently adjustable calibration circuits are configured to compensate for timing differences across the plurality of serial data paths, and
data dependent jitter of the plurality of serial data paths is less than or equal to 15 percent of a data eye of the plurality of serial data paths.

* * * * *

UNITED STATES PATENT AND TRADEMARK OFFICE
CERTIFICATE OF CORRECTION

PATENT NO. : 9,577,818 B2
APPLICATION NO. : 14/614326
DATED : February 21, 2017
INVENTOR(S) : George W. Conner It is certified that error appears in the above-identified patent and that said Letters Patent is hereby corrected as shown below:

In the Claims

Claim 1, at Column 10, Line 20, the words "Serializer-DeSerialize" should be replaced with the words --Serializer-Deserializer--;
    At Column 10, Line 29, the word "docked" should be replaced with the word --clocked--;
    At Column 10, Line 30, the word "dock" should be replaced with the word --clock--; and
    At Column 10, Line 35, in both occurrences of the word "dock" should be replaced with the word --clock--.

Claim 8, at Column 10, Line 61, the words "Serializer-DeSerialize" should be replaced with the words --Serializer-Deserializer--;
    At Column 11, Line 3, replace the word "docked" with the word --clock--; and
    At Column 11, Line 4, the word "dock" should be replaced with the word --clock--.

Claim 11, at Column 12, Line 11, the words "Serializer-DeSerialize" should be replaced with the words --Serializer-Deserializer--;
    At Column 12, Line 20, the word "docked" should be replaced with the word --clocked--; and
    At Column 12, Line 21, the word "dock" should be replaced with the word --clock--.

Signed and Sealed this
Twenty-sixth Day of June, 2018

Andrei Iancu
*Director of the United States Patent and Trademark Office*